(12) United States Patent
Heo et al.

(10) Patent No.: US 8,120,880 B2
(45) Date of Patent: Feb. 21, 2012

(54) SUSPENSION ASSEMBLY AND ACTUATOR HAVING THE SAME IN HARD DISK DRIVE

(75) Inventors: Baek-ho Heo, Suwon-si (KR); Tae-Hwa Kim, Jeonju-si (KR); Min-pyo Hong, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 351 days.

(21) Appl. No.: 12/428,496

(22) Filed: Apr. 23, 2009

(65) Prior Publication Data

US 2009/0268346 A1    Oct. 29, 2009

(30) Foreign Application Priority Data

Apr. 24, 2008 (KR) .................. 10-2008-0038254

(51) Int. Cl.
*G11B 5/54* (2006.01)
*G11B 21/22* (2006.01)

(52) U.S. Cl. ..................... 360/255; 360/255.9
(58) Field of Classification Search ..... 360/254.3–255.9
See application file for complete search history.

(56) References Cited

U.S. PATENT DOCUMENTS

| | | | |
|---|---|---|---|
| 6,181,529 B1 * | 1/2001 | Aoyagi et al. | 360/255 |
| 7,301,730 B2 * | 11/2007 | Lee et al. | 360/255 |
| 7,558,024 B2 * | 7/2009 | Tada et al. | 360/255 |
| 7,706,106 B1 * | 4/2010 | Mei et al. | 360/255 |
| 7,804,664 B1 * | 9/2010 | Tokuda | 360/255 |
| 2005/0030671 A1 * | 2/2005 | Lee et al. | 360/255 |
| 2006/0171079 A1 * | 8/2006 | Tada et al. | 360/255 |
| 2006/0268463 A1 | 11/2006 | Ohwe | |
| 2008/0151434 A1 * | 6/2008 | Huha et al. | 360/254.8 |

FOREIGN PATENT DOCUMENTS

| | | |
|---|---|---|
| JP | 10-302421 | 11/1998 |
| JP | 2005-116129 | 4/2005 |
| KR | 2004-0110680 | 12/2004 |

* cited by examiner

*Primary Examiner* — Will J Klimowicz
(74) *Attorney, Agent, or Firm* — Stanzione & Kim, LLP

(57) ABSTRACT

A suspension assembly and an actuator having the same, which are of a hard disk drive (HDD). The suspension assembly includes a load beam coupled to an end of a swing arm of an actuator; a flexure attached to the load beam to support the slider; and a tip-tab which extends from a front end of the load beam to contact a ramp when the read/write head is parked, wherein a width of a contact part of the tip-tab that contacts the ramp is wider than other parts of the tip-tab. A width of a part of the tip-tab engaged with the load beam and a width of a front part of the tip-tab are smaller than the width of the contact part. The width of the tip-tab increases gradually from the front end of the load beam up to the contact part, and decreases gradually after the contact part.

12 Claims, 5 Drawing Sheets

SUSPENSION ASSEMBLY AND ACTUATOR HAVING THE SAME IN HARD DISK DRIVE

CROSS-REFERENCE TO RELATED APPLICATIONS

This application claims the benefit of Korean Patent Application No. 10-2008-0038254, filed on Apr. 24, 2008, in the Korean Intellectual Property Office, the disclosure of which is incorporated herein in its entirety by reference.

BACKGROUND OF THE INVENTION

1. Field of the Invention

The present general inventive concept relates to a hard disk drive (HDD), and more particularly, to a suspension assembly and an actuator having the suspension assembly, which has a tip-tab to contact a ramp to park a head.

2. Description of the Related Art

A hard disk drive (HDD), which is one type of information storage device, records data to a disk or reproduces data stored in a disk via a read/write head. The read/write head is moved to a desired position by an actuator while floating at a predetermined height from a recording surface of a rotating disk, so as to read/write data.

A conventional HDD includes a disk, a spindle motor for rotating a disk, a read/write head, and an actuator that moves the read/write head to a desired position on the disk. These components are installed in a base member and protected by a cover member. The actuator includes a swing arm rotatably mounted on an actuator pivot, a suspension assembly which is installed on a front end of the swing arm and which elastically biases a slider having the read/write head toward a surface of the disk, and a voice coil motor (VCM) for rotating the swing arm.

When the HDD is powered and the disk starts rotating, the VCM rotates the swing arm of the actuator counterclockwise so as to move the slider with the read/write head above a recording surface of the disk, and the read/write head reproduces or records data from/on the recording surface of the disk.

When the HDD stops operating, that is, when rotation of the disk is stopped, the VCM rotates the swing arm of the actuator clockwise so as to move the read/write head to a position separated from the recording surface of the disk. By doing so, the VCM prevents the read/write head from hitting the recording surface of the disk. For this, a ramp is installed in the vicinity of the disk, and the suspension assembly includes a tip-tab contacting the ramp.

FIG. 1A is a perspective view of a conventional tip-tab included in a suspension assembly of a HDD. FIG. 1B is a cross-sectional view of portion A1 in the conventional tip-tab of FIG. 1A.

Referring to FIGS. 1A and 1B, the suspension assembly of the HDD includes a tip-tab 20 extending from a front end of a load beam 10. When the HDD stops operating, the tip-tab 20 is placed on a ramp that is installed in the vicinity of a disk, so as to park the read/write head on the ramp. Since the tip-tab 20 is located far away from a pivot center of the actuator, the entire inertia of the suspension assembly is greatly increased even though only a minute weight is added, such that impact properties deteriorate. Thus, in order to reduce the weight of the tip-tab 20, the tip-tab 20 is designed to become gradually narrower in a direction extending away from the load beam 10. Also, in order to enhance the rigidity of the tip-tap 20, the tip-tab 20 is designed to have a convex section toward the ramp.

As the actuator is rotated by a VCM, the tip-tab 20 is in a sliding contact with a surface of the ramp. However, since the width of the tip-tab 20 is narrow at a contact point (portion A1 in FIG. 1A) with the ramp, a curvature radius R1 becomes smaller, such that a contact area between the tip-tab 20 and the ramp becomes smaller. If the contact area between the tip-tab 20 and the ramp is small, the surface of the ramp and a surface of the tip-tab 20 are likely to wear out due to mutual friction, and particles generated by such friction contaminate the inside of the HDD, thereby affecting the operation of the HDD.

FIG. 2A is a perspective view of another conventional tip-tab included in a suspension assembly of a HDD. FIG. 2B is a cross-sectional view of portion A2 in the conventional tip-tab of FIG. 2A.

Referring to FIGS. 2A and 2B, a tip-tab 30 having a constant width may extend from the front end of the load beam 10. In this case, a width of the tip-tab 30 is wide at a contact point (portion A2 in FIG. 2A) with a ramp. In other words, a curvature radius R2 becomes larger, so that a contact area between the tip-tab 30 and the ramp becomes larger, and abrasion between surfaces of the tip-tab 30 and the ramp is reduced. However, when the width of the tip-tab 30 becomes wider, the weight of the tip-tab 30 increases, such that a weight of the suspension assembly is increased, and the impact properties deteriorate.

SUMMARY OF THE INVENTION

The present general inventive concept provides a suspension assembly and an actuator having the suspension assembly, the suspension assembly including a tip-tab having a structure that can enlarge a contact area with a ramp and minimize a weight increase of the suspension assembly.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a suspension assembly used with a hard disk drive (HDD), the suspension assembly to elastically bias a slider having a read/write head toward a surface of a disk, and including a load beam coupled to an end of a swing arm of an actuator; a flexure attached to the load beam so as to support the slider; and a tip-tab which extends from a front end of the load beam so as to contact a ramp that is installed in the vicinity of the disk when the read/write head is parked, wherein a width of a contact part of the tip-tab that contacts the ramp is wider than other parts of the tip-tab.

The contact part of the tip-tab may be positioned in the middle part of the tip-tab in a longitudinal direction. Also a width of a part engaged with the load beam and a width of a front part of the tip-tab may be smaller than the width of the contact part.

The width of the tip-tab may increase gradually from the front end of the load beam up to the contact part, and decrease gradually after the contact part.

The tip-tab may have a section that is convex toward the ramp. In this case, a curvature radius of the contact part may be larger than a curvature radius of the front part.

The foregoing and/or other aspects and utilities of the present general inventive concept may also be achieved by providing an actuator used with an HDD, the actuator including a swing arm rotatably mounted on a base member; a suspension assembly to elastically bias a slider having a read/write head toward a surface of a disk; and a voice coil motor (VCM) to rotate the swing arm so as to move the read/write head to a predetermined position on the disk, wherein the suspension assembly includes a load beam coupled to an end of a swing arm of an actuator; a flexure attached to the load beam so as to support the slider; and a tip-tab which extends from a front end of the load beam so as to contact a ramp that is installed in the vicinity of the disk when the read/write head is parked, wherein a width of a contact part of the tip-tab that contacts the ramp is wider than other parts of the tip-tab.

The foregoing and/or other aspects and utilities of the present general inventive concept may also be achieved by providing a swing arm of a suspension assembly, including a load beam extending from the swing arm, a flexure extending below the load beam and including a slider to read from and write to a disk and a tip-tab extending from an end of the load beam opposite to the swing arm, the tip-tab including a convex shape and being curved while extending away from the load beam.

The curve of the tip-tab may include sides which extend toward each other to form a narrow width W1 and then away from each other to form a wider width W2 and then back toward each other to form a narrow width W3.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Figure 1A:
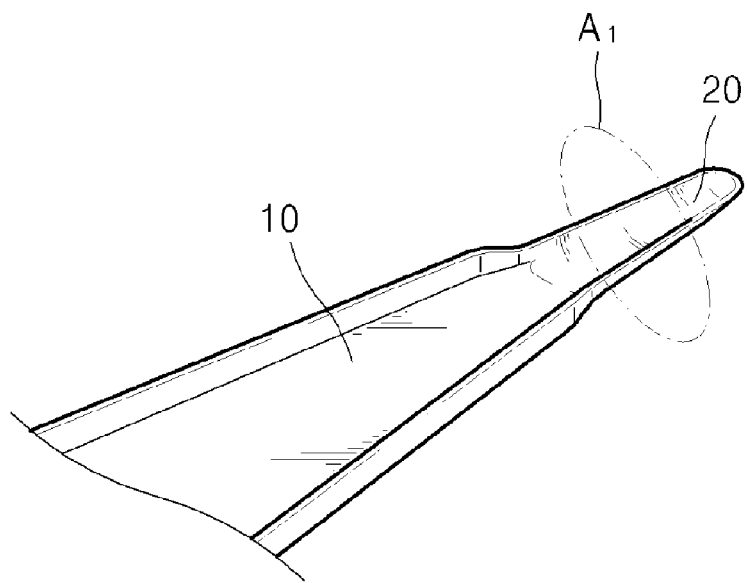
FIG. 1A is a perspective view of a conventional tip-tab included in a suspension assembly of a hard disk drive (HDD)

A suspension assembly and an actuator having the same, for use in a hard disk drive (HDD), according to embodiments of the present general inventive concept will now be described more fully with reference to the accompanying drawings, in which exemplary embodiments of the general inventive concept are shown. Like reference numerals in the drawings denote like elements.

Figure 3:
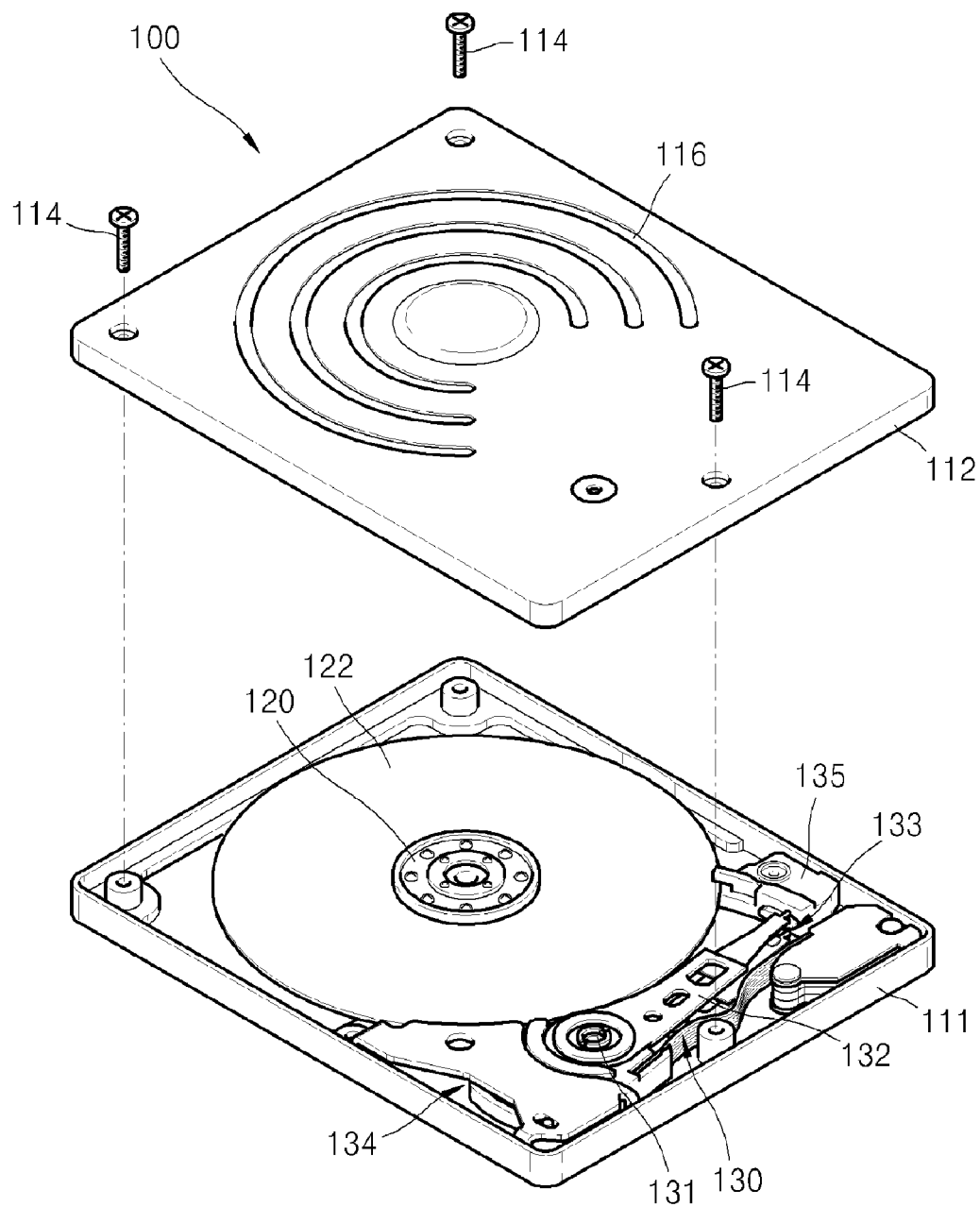
FIG. 3 is an exploded perspective view of a HDD including a suspension assembly having a tip-tab according to an embodiment of the present general inventive concept.
Figure 4:
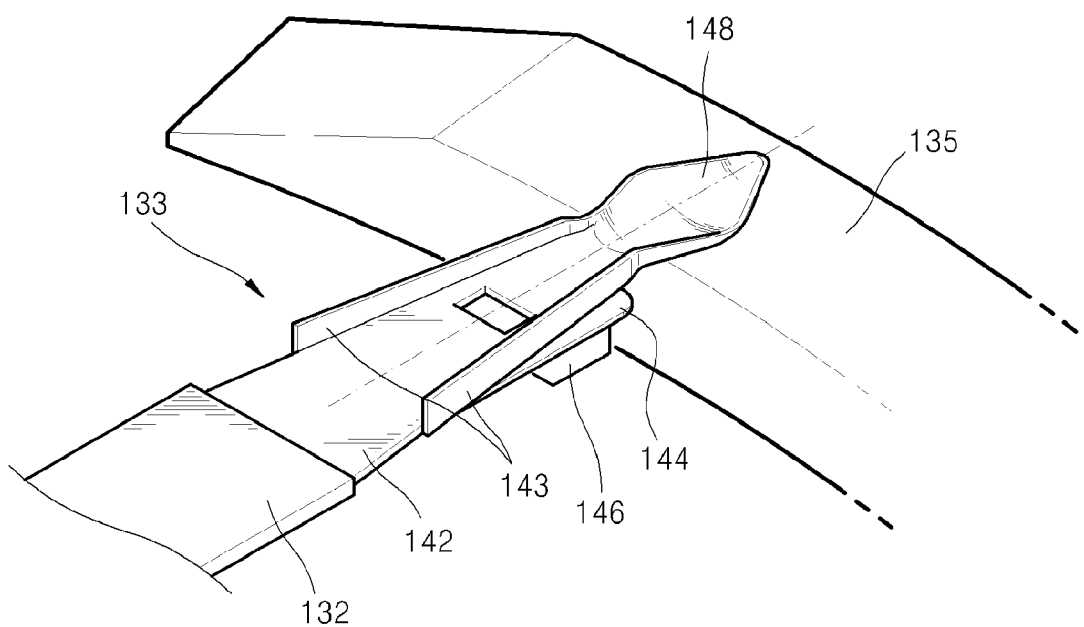
FIG. 4 is a magnified perspective view of the suspension assembly and a parking ramp illustrated in FIG. 3.

FIG. 3 is an exploded perspective view of an HDD 100 including a suspension assembly 133 having a tip-tab according to an embodiment of the present general inventive concept. FIG. 4 is a magnified perspective view of the suspension assembly 133 and a parking ramp 135 illustrated in FIG. 3.

Referring to FIGS. 3 and 4, the HDD 100 includes a spindle motor 120, a disk 122 mounted on the spindle motor 120 to rotate the disk 122, and an actuator 130 to move a read/write head to record and reproduce data to a predetermined position on the disk 122. The actuator 130 includes a swing arm 132 rotatably mounted on an actuator pivot 131, the suspension assembly 133 which is installed on a front end of the swing arm 132 and which elastically biases a slider 146 having the read/write head toward a surface of the disk 122, and a voice coil motor (VCM) 134 to rotate the swing arm 132.

The VCM 134 is controlled by a servo control system, and rotates the swing arm 132 of the actuator 130 in a direction based on the Fleming's left hand rule, due to interaction between a current input to a VCM coil and a magnetic field formed by a magnet. That is, when the HDD 100 is powered and the disk 122 starts rotating, the VCM 134 rotates the swing arm 132 counterclockwise so as to move the read/write head above a recording surface of the disk 122. Conversely, when power is not supplied to the HDD 100 any more and the disk 122 stops rotating, the VCM 134 rotates the swing arm 132 clockwise so as to move the read/write head away from the disk 122. Then, the read/write head, which has been moved away from the recording surface of the disk 122, is parked on a parking ramp 135 that is installed in the vicinity of the disk 122.

The spindle motor 120 and the actuator 130 are installed on a base member 111. A cover member 112 is attached to the base member 111 via a plurality of screws 114. A plurality of reinforcing concentric grooves 116 may be formed in the cover member 112 so as to enhance the rigidity of the cover member 112.

The suspension assembly 133 includes a load beam 142 coupled to the swing arm 132 of the actuator 130, a flexure 144 attached to the load beam 142, and a tip-tab 148 extending from a front end of the load beam 142. In order to enhance the rigidity of the load beam 142, side walls 143 on both side ends of the load beam 142 may be bent. The slider 146 with the read/write head is attached to the flexure 144.

In the current embodiment, the tip-tab 148 contacts a surface of the parking ramp 135 when the read/write head is parked. With regard to the tip-tab 148, a width of a portion thereof which contacts the parking ramp 135 is wider than a width of other portions of the tip-tab 148. This will now be described in detail with reference to FIGS. 5A and 5B.

Figure 5A:
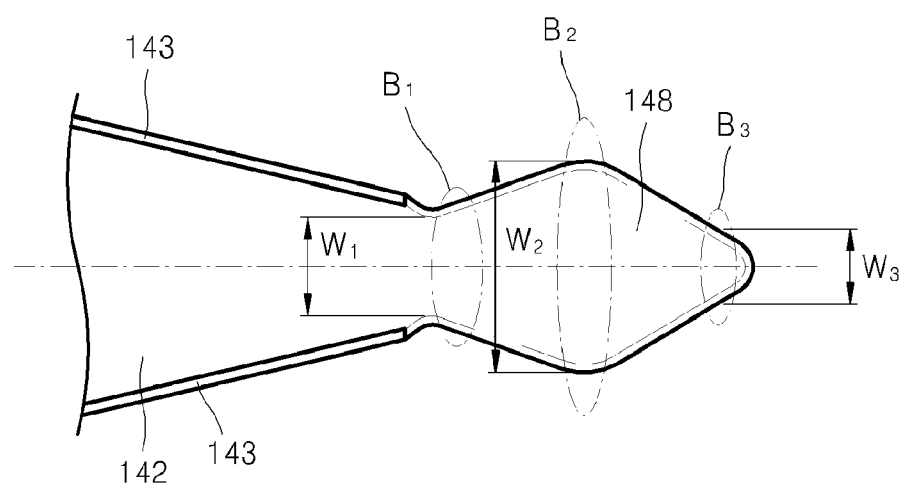
FIG. 5A is a plan view of a tip-tab illustrated in FIG. 4.
Figure 5B:
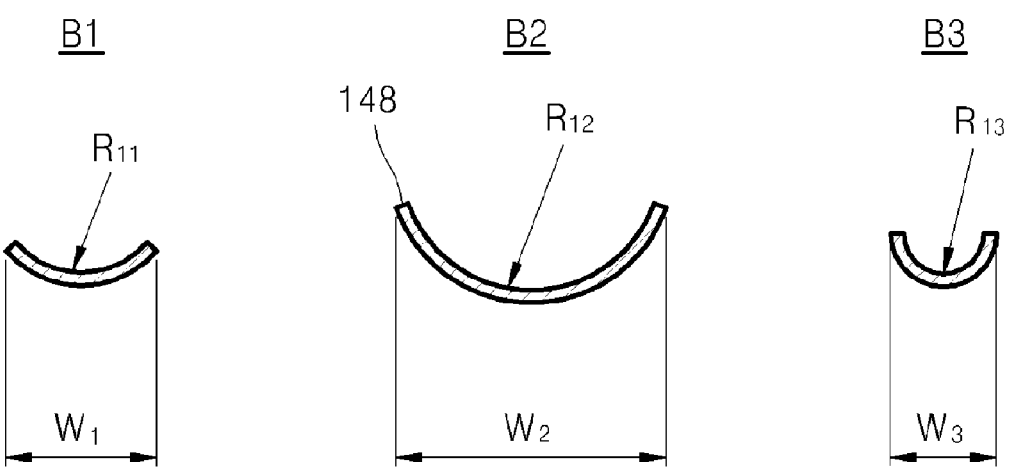
FIG. 5B illustrates cross-sectional views of an engaging part B1, a contact part B2, and a front part B3 illustrated in FIG. 5A.

FIG. 5A is a plan view of the tip-tab 148 illustrated in FIG. 4. FIG. 5B illustrates cross-sectional views of an engaging part B1, a contact part B2, and a front part B3 of the tip-tab 148 illustrated in FIG. 5A.

Referring to FIGS. 5A and 5B, the tip-tab 148 extends in a longitudinal direction of the load beam 142 from the front end of the load beam 142, by as much as a predetermined length. An approximately middle part of the tip-tab 148 in a longitudinal direction corresponds to the contact part B2 that contacts the parking ramp 135. A width W2 of the contact part B2 is wider than a width W1 of the engaging part B1 that is engaged with the load beam 142, and is wider than a width W3 of the front part B3. For example, the tip-tab 148 may have a shape gradually increasing from the front end of the load beam 142 up to the middle part thereof, and gradually decreasing thereafter.

The tip-tab 148 may have a section that is convex facing toward the surface of the parking ramp 135, so as to enhance the rigidity of the tip-tab 148. For example, the sides of the tip-tab 148 can be curved upward with respect to the middle portion to form a convex shape. A section of the contact part B2 of the tip-tab 148 has a predetermined curvature radius R12 which may be larger than a curvature radius R13 of the front part B3. Also, the curvature radius R12 of the contact part B2 of the tip-tab 148 may be substantially larger than the curvature radius R1 of the conventional tip-tab 20 illustrated in FIGS. 1A and 1B. Meanwhile, since the engaging part B1 of the tip-tab 148 is engaged with the load beam 142 that is flat, the width W1 of the engaging part B1 is narrow, but a curvature radius R11 thereof may be relatively large.

As described above with regard to the tip-tab 148, the width W2 of the contact part B2, which contacts the parking ramp 135, is wide, and the curvature radius R12 is substantially large so that a contact area between the tip-tab 148 and the parking ramp 135 becomes larger. Thus, even though friction occurs between the tip-tab 148 and the parking ramp 135, abrasion of surfaces of the tip-tab 148 and the parking ramp 135 may be reduced.

Except for the contact part B2 that is located at the middle part of the tip-tab 148 in the longitudinal direction, the width W1 of the engaging part B1 and the width W3 of the front part B3 of the tip-tab 148 remain relatively small. Thus, the weight increase of the tip-tab 148 is minimized as compared to the conventional tip-tab 20 with the narrow width illustrated in FIGS. 1A and 1B, and the tip-tab 148 has a substantially small weight compared to the conventional tip-tab 30 with a wide width illustrated in FIGS. 2A and 2B. Hence, the tip-tab 148 may prevent deterioration of the impact properties.

Table 1 shows an impulse according to the shape of a tip-tab.

Figure 1B:
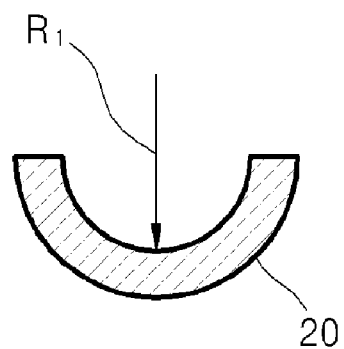
FIG. 1B is a cross-sectional view of portion A1 in the conventional tip-tab of FIG. 1A.
Figure 2A:
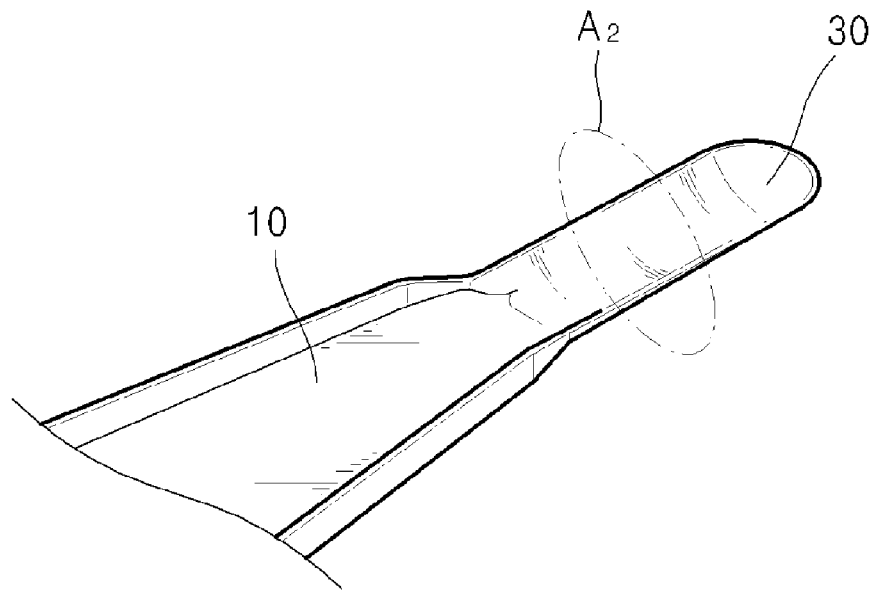
FIG. 2A is a perspective view of another conventional tip-tab included in a suspension assembly of a HDD.
Figure 2B:
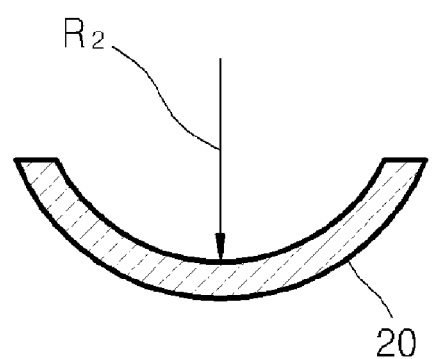
FIG. 2B is a cross-sectional view of portion A2 in the conventional tip-tab of FIG. 2A.

In Table 1, 'conventional 1' refers to the conventional tip-tab 20 with the narrow width illustrated in FIGS. 1A and 1B, and 'conventional 2' refers to the conventional tip-tab 30 with the wide width illustrated in FIGS. 2A and 2B. Also, 'impulse' indicates the minimum value in which a slider collides with a disk. 'LB T1' a torsion mode of a load beam, 'LB B1' a bending mode of the load beam, and 'LB Sway' indicates a sway mode of the load beam.

TABLE 1

| Division | | Conventional 1 | Conventional 2 | Present invention |
|---|---|---|---|---|
| Curvature radius of contact part | | 0.15 mm | 0.3 mm | 0.32 mm |
| Impulse | | 379 G/gram | 369 G/gram | 375 G/gram |
| Resonance frequency | LB T1 | 7372 | 7282 | 7363 |
| | LB B1 | 8069 | 7937 | 8038 |
| | LB Sway | 9555 | 9122 | 9524 |

Referring to Table 1, since the curvature radius of the contact part B2 of the tip-tab 148 according to the current embodiment is more than twice that of the conventional tip-tab 20 with the narrow width, the contact area between the tip-tab 148 and the parking ramp 135 is larger. Also, it is apparent that although the impact properties of the conventional tip-tab 30 with the wide width deteriorate, as compared to the conventional tip-tab 20 with the narrow width, there is almost no deterioration of the impact properties of the tip-tab 148 according to the current embodiment, as compared to the conventional tip-tab 20 with the narrow width.

While this present general inventive concept has been particularly shown and described with reference to exemplary embodiments thereof, it will be understood by those of ordinary skill in the art that various changes in form and details may be made therein without departing from the spirit and scope of the general inventive concept as defined by the appended claims. The exemplary embodiments should be considered in a descriptive sense only and not for purposes of limitation. Therefore, the scope of the general inventive concept is defined not by the detailed description of the invention but by the appended claims, and all differences within the scope will be construed as being included in the present general inventive concept.

What is claimed is:

1. A suspension assembly used with a HDD (hard disk drive), the suspension assembly to elastically bias a slider having a read/write head toward a surface of a disk, and comprising:
a load beam coupled to an end of a swing arm of an actuator;
a flexure attached to the load beam to support the slider; and
a tip-tab which extends from a front end of the load beam to contact a ramp that is installed in the vicinity of the disk when the read/write head is parked, wherein a width of a contact part of the tip-tab that contacts the ramp is wider than other parts of the tip-tab, the contact part of the tip-tab is positioned in the middle part of the tip-tab in a longitudinal direction, and a width of a part engaged with the load beam and a width of a front part of the tip-tab are smaller than the width of the contact part.

2. The suspension assembly of claim 1, wherein the width of the tip-tab increases gradually from the front end of the load beam up to the contact part, and decreases gradually after the contact part.

3. The suspension assembly of claim 1, wherein the tip-tab has a section that is convex toward the ramp.

4. The suspension assembly of claim 3, wherein a curvature radius of the contact part is larger than a curvature radius of the front part.

5. An actuator used with an HDD, the actuator comprising:
a swing arm rotatably mounted on a base member;
a suspension assembly elastically biasing a slider having a read/write head toward a surface of a disk; and
a VCM (voice coil motor) rotating the swing arm to move the read/write head to a predetermined position on the disk,
wherein the suspension assembly comprises:
a load beam coupled to an end of a swing arm of an actuator;
a flexure attached to the load beam to support the slider; and
a tip-tab which extends from a front end of the load beam to contact a ramp that is installed in the vicinity of the disk when the read/write head is parked, wherein a width of a contact part of the tip-tab that contacts the ramp is wider than other parts of the tip-tab, the contact part of the tip-tab is positioned in the middle part of the tip-tab in a longitudinal direction, and a width of a part engaged with the load beam and a width of a front part of the tip-tab are smaller than the width of the contact part.

6. The actuator of claim 5, wherein the width of the tip-tab increases gradually from the front end of the load beam up to the contact part, and decreases gradually after the contact part.

7. The actuator of claim 5, wherein the tip-tab has a section that is convex toward the ramp.

8. The actuator of claim 7, wherein a curvature radius of the contact part is larger than a curvature radius of the front part.

9. A swing arm of a suspension assembly, comprising:
a load beam extending from the swing arm;
a flexure extending below the load beam and including a slider to read from and write to a disk; and
a tip-tab extending from an end of the load beam opposite to the swing arm, the tip-tab including a convex shape and being curved while extending away from the load beam such that the curve of the tip-tab includes sides which extend toward each other to form a narrow width W1 and then away from each other to form a wider width W2 and then back toward each other to form a narrow width W3.

10. The swing arm of claim 9, wherein W2>W1>W3.

11. The swing arm of claim 10, wherein the convex shape of the tip-tab has a first radius R11 at W1, and second radius R12 at W2 and a third radius R13 at W3.

12. The swing arm of claim 11, wherein R12 is substantially greater than R11 and R13.

* * * * *